(12) United States Patent
Pijewski et al.

(10) Patent No.: US 10,223,407 B2
(45) Date of Patent: Mar. 5, 2019

(54) ASYNCHRONOUS PROCESSING TIME METRICS

(71) Applicant: AppDynamics LLC, San Francisco, CA (US)

(72) Inventors: William Drake Pijewski, San Francisco, CA (US); Peter Howard Holditch, Berkhamsted (GB); Vinay Srinivasaiah, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 500 days.

(21) Appl. No.: 14/530,564

(22) Filed: Oct. 31, 2014

(65) Prior Publication Data

US 2016/0125060 A1 May 5, 2016

(51) Int. Cl.
*G06F 17/30* (2006.01)
(52) U.S. Cl.
CPC .............................. *G06F 17/30377* (2013.01)
(58) Field of Classification Search
CPC .......................... G06F 17/30377; H04L 67/10
See application file for complete search history.

(56) References Cited

U.S. PATENT DOCUMENTS

| | | | | |
|---|---|---|---|---|
| 6,802,062 | B1 * | 10/2004 | Oyamada | G06F 9/45558 718/1 |
| 7,944,952 | B2 * | 5/2011 | Smyers | G06F 13/128 370/389 |
| 9,167,028 | B1 * | 10/2015 | Bansal | H04L 43/50 |
| 2014/0244721 | A1 * | 8/2014 | Taine | H04L 65/40 709/203 |

OTHER PUBLICATIONS

U.S. Appl. No. 14/530,443, Suraj Puvvada, Tracking Asynchronous Entry Points for an Application, filed Oct. 31, 2014.
U.S. Appl. No. 14/701,414, Michael Margoolis, Agent Asynchronous Transaction Monitor, filed Apr. 30, 2015.
U.S. Appl. No. 14/701,418, Sanjay Nagaraj, Asynchronous Custom Exit Points, filed Apr. 30, 2015.

* cited by examiner

*Primary Examiner* — Cheryl Lewis
(74) *Attorney, Agent, or Firm* — Parker Ibrahim & Berg LLP; James M. Behmke; Stephen D. LeBarron

(57) ABSTRACT

Asynchronous operations associated with a request such as threads, runnable elements, callable elements, and other invokable objects are tracked to determine the metrics about the request and operations. The present technology tracks the start and end of each asynchronous operation and maintains a counter which tracks the currently pending or executing asynchronous operations. By monitoring the request, the start and end of each asynchronous operation associated with the request, and the number of asynchronous operations currently executing, the present technology may identify the end of a request by identifying when the last asynchronous operation associated with the request ends. In some instances, the present technology identifies the end of a request when a counter which tracks the number of asynchronous operations executing reaches a value of zero after the first asynchronous operation has already begun. Tracking these operations allows the present technology to aggregate and report useful performance data about these requests.

30 Claims, 5 Drawing Sheets

ASYNCHRONOUS PROCESSING TIME METRICS

BACKGROUND OF THE INVENTION

The World Wide Web has expanded to provide web services faster to consumers. Web services may be provided by a web application which uses one or more services to handle a transaction. The applications may be distributed over several machines, making the topology of the machines that provides the service more difficult to track and monitor.

Accurate monitoring of web-based applications is very important to businesses in order to ensure customer loyalty and ability to support a business. Application monitoring often involves monitoring a request from beginning to end. Simple requests have a single execution thread. The simple execution thread has a single start and a single end point, and may be easy to keep track of. Modern requests, however, may have several components, sub-processes, and may be asynchronous at least in parts. These modern requests with asynchronous sub-processes are more difficult to monitor.

What is needed is an improved method for monitoring modern requests with asynchronous sub-processes.

SUMMARY

The present technology detects threads, runnable elements, callable elements, and other invokable objects (collectively considered asynchronous operations) and associates them with a request being monitored. Specifically, these operations are asynchronous since the service which first handles the request may delegate further processing to an asynchronous operation without waiting for that delegated processing to complete. The present technology tracks the start and end of each asynchronous operation and maintains a counter which tracks the currently executing asynchronous operations. By monitoring the request, the start and end of each asynchronous operation associated with the request, and the number of asynchronous operations pending or currently executing, the present technology may identify the end of a request by identifying when the last asynchronous operation associated with the request ends. In some instances, the present technology identifies the end of a request when a counter which tracks the number of asynchronous operations executing reaches a value of zero after the first asynchronous operation has already begun. In other cases, if an asynchronous operation is created but does not execute, the present technology will track that request and may report performance data well after the original request has completed. The technology will watch for operations which have not executed but have been abandoned from the original request, and when those operations are removed from the system (e.g. by a memory garbage collector), the agent will report performance data.

An embodiment may include a method for monitoring an application. A request is monitored as part of a distributed business transaction. One or more asynchronous objects associated with the request may be detected. The one or more asynchronous objects are monitored as part of monitoring the request. Performance data is reported both for the asynchronous objects and request.

An embodiment may include a system for monitoring a business transaction. The system may include a processor, a memory and one or more modules stored in memory and executable by the processor. When executed, the one or more modules may monitor a request as part of a distributed business transaction, detect one or more asynchronous objects associated with the request, monitor the one or more asynchronous objects as part of monitoring the request, and report performance data for the asynchronous objects and request.

DETAILED DESCRIPTION

The present technology detects threads, runnable elements, callable elements, and other invokable objects (collectively considered asynchronous operations) and associates them with a request being monitored. Specifically, these operations are asynchronous since the service which first handles the request may delegate further processing to an asynchronous operation without waiting for that delegated processing to complete. The present technology tracks the start and end of each asynchronous operation and maintains a counter which tracks the pending and currently executing asynchronous operations. By monitoring the request, the start and end of each asynchronous operation associated with the request, and the number of asynchronous operations currently executing, the present technology may identify the end of a request by identifying when the last asynchronous operation associated with the request ends. In some instances, the present technology identifies the end of a request when a counter which tracks the number of asynchronous operations pending reaches a value of zero after the first asynchronous operation has already begun. In other cases, if an asynchronous operation is created but does not execute, the present technology will track that request and may report performance data well after the original request has completed. The technology will watch for operations which have not executed but have been abandoned from the original request, and when those operations are removed from the system (e.g. by a memory garbage collector), the agent will report performance data.

In some instances, tracking of asynchronous callable, runnable, invocable objects, and so forth, may be performed in a manner other than utilizing a counter. For example, an agent waits for these asynchronous operations to be reclaimed by the garbage collector and then report performance data. This process of monitoring the garbage collector could also be used to track the asynchronous operation in the case where an application does not execute all its operations.

Figure 1:
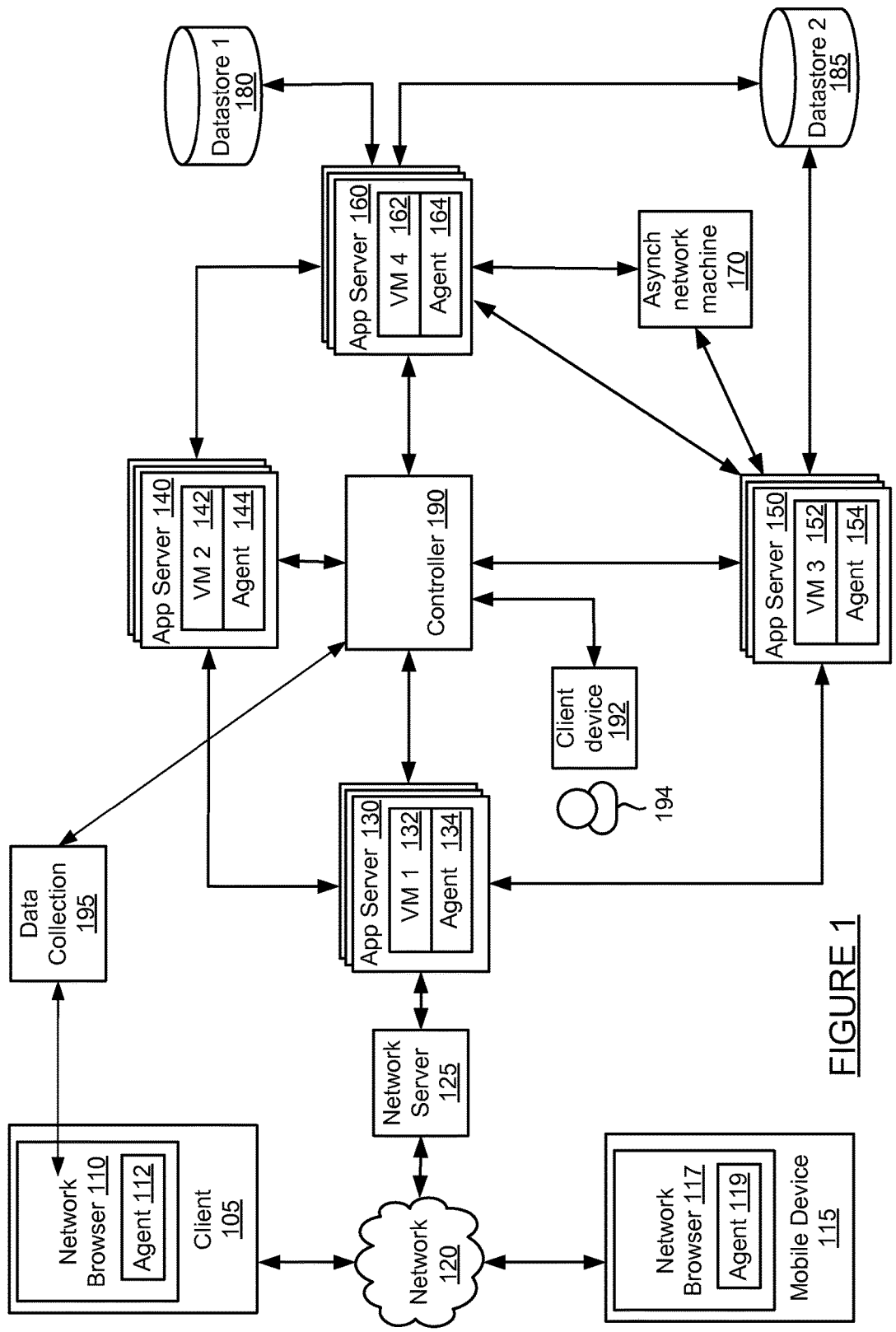
FIG. 1 is a block diagram of a system for monitoring a request with asynchronous operations.

FIG. 1 is a block diagram of a system for monitoring a request with asynchronous operations. System 100 of FIG. 1 includes client device 105 and 192, mobile device 115, network 120, network server 125, application servers 130, 140, 150 and 160, asynchronous network machine 170, data stores 180 and 185, and controller 190.

Client device 105 may include network browser 110 and be implemented as a computing device, such as for example a laptop, desktop, workstation, or some other computing device. Network browser 110 may be a client application for viewing content provided by an application server, such as application server 130 via network server 125 over network 120. Mobile device 115 is connected to network 120 and may be implemented as a portable device suitable for receiving content over a network, such as for example a mobile phone, smart phone, or other portable device. Both client device 105 and mobile device 115 may include hardware and/or software configured to access a web service provided by network server 125.

Network 120 may facilitate communication of data between different servers, devices and machines. The network may be implemented as a private network, public network, intranet, the Internet, a Wi-Fi network, cellular network, or a combination of these networks.

Network server 125 is connected to network 120 and may receive and process requests received over network 120. Network server 125 may be implemented as one or more servers implementing a network service. When network 120 is the Internet, network server 125 may be implemented as a web server. Network server 125 and application server 130 may be implemented on separate or the same server or machine.

Application server 130 communicates with network server 125, application servers 140 and 150, controller 190. Application server 130 may also communicate with other machines and devices (not illustrated in FIG. 1). Application server 130 may host an application or portions of a distributed application and include a virtual machine 132, agent 134, and other software modules. Application server 130 may be implemented as one server or multiple servers as illustrated in FIG. 1.

Application servers may or may not include virtual machines. For example, a .NET application server may not include a virtual machine and may be used in place of any application server 130-160 in the system of FIG. 1. References to a virtual machine for each application server are intended to be for exemplary purposes only.

Virtual machine 132 may be implemented by code running on one or more application servers. The code may implement computer programs, modules and data structures to implement, for example, a virtual machine mode for executing programs and applications. In some embodiments, more than one virtual machine 132 may execute on an application server 130. A virtual machine may be implemented as a Java Virtual Machine (JVM). Virtual machine 132 may perform all or a portion of a business transaction performed by application servers comprising system 100. A virtual machine may be considered one of several services that implement a web service.

Virtual machine 132 may be instrumented using byte code insertion, or byte code instrumentation, to modify the object code of the virtual machine. The instrumented object code may include code used to detect calls received by virtual machine 132, calls sent by virtual machine 132, and communicate with agent 134 during execution of an application on virtual machine 132. Alternatively, other code may be byte code instrumented, such as code comprising an application which executes within virtual machine 132 or an application which may be executed on application server 130 and outside virtual machine 132.

In embodiments, application server 130 may include software other than virtual machines, such as for example one or more programs and/or modules that processes AJAX requests.

Agent 134 on application server 130 may be installed on application server 130 by instrumentation of object code, downloading the application to the server, or in some other manner. Agent 134 may be executed to monitor application server 130, monitor virtual machine 132, and communicate with byte instrumented code on application server 130, virtual machine 132 or another application or program on application server 130. Agent 134 may detect operations such as receiving calls and sending requests by application server 130 and virtual machine 132. Agent 134 may receive data from instrumented code of the virtual machine 132, process the data and transmit the data to controller 190. Agent 134 may perform other operations related to monitoring virtual machine 132 and application server 130 as discussed herein. For example, agent 134 may identify other applications, share business transaction data, aggregate detected runtime data, and other operations.

Each of the agents in the system of FIG. 1 may include a hash table. The hash table may store reference information for each request in the system of FIG. 1 that includes a count of the number of asynchronous operations currently pending for a request.

Each of application servers 140, 150 and 160 may include an application and an agent. Each application may run on the corresponding application server or a virtual machine. Each of virtual machines 142, 152 and 162 on application servers 140-160 may operate similarly to virtual machine 132 and host one or more applications which perform at least a portion of a distributed business transaction. Agents 144, 154 and 164 may monitor the virtual machines 142-162 or other software processing requests, collect and process data at runtime of the virtual machines, and communicate with controller 190. The virtual machines 132, 142, 152 and 162 may communicate with each other as part of performing a distributed transaction. In particular each virtual machine may call any application or method of another virtual machine.

Asynchronous network machine 170 may engage in asynchronous communications with one or more application servers, such as application server 150 and 160. For example, application server 150 may transmit several calls or messages to an asynchronous network machine. Rather than communicate back to application server 150, the asynchronous network machine may process the messages and eventually provide a response, such as a processed message, to application server 160. Because there is no return message from the asynchronous network machine to application server 150, the communications between them are asynchronous.

Data stores 180 and 185 may each be accessed by application servers such as application server 150. Data store 185 may also be accessed by application server 150. Each of data stores 180 and 185 may store data, process data, and return queries received from an application server. Each of data stores 180 and 185 may or may not include an agent.

Controller 190 may control and manage monitoring of business transactions distributed over application servers 130-160. Controller 190 may receive runtime data from each of agents 134-164, associate portions of business transaction data, communicate with agents to configure collection of runtime data, and provide performance data and reporting through an interface. The interface may be viewed as a web-based interface viewable by mobile device 115, client device 105, or some other device. In some embodiments, a client device 192 may directly communicate with controller 190 to view an interface for monitoring data.

Controller 190 may provide an agent for one or more virtual machines and/or application servers 130. Controller 190 may receive correlation configuration data, such as an object, a method, or class identifier, from a user through client device 192.

Data collection server 195 may communicate with client 105, 115 (not shown in FIG. 1), and controller 190, as well as other machines in the system of FIG. 1. Data collection server 195 may receive data associated with monitoring a client request at client 105 (or mobile device 115) and may store and aggregate the data. The stored and/or aggregated data may be provided to controller 190 for reporting to a user.

Figure 2:
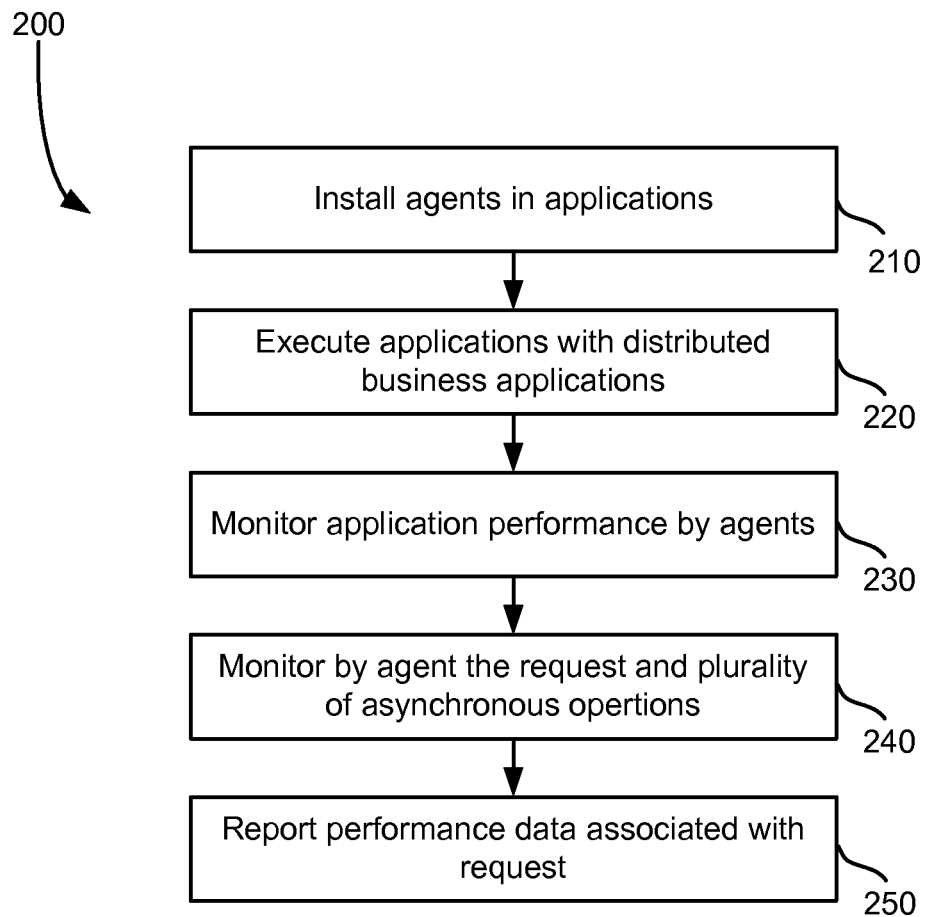
FIG. 2 is a method for monitoring a request with asynchronous operations.

FIG. 2 is a method for monitoring a request with asynchronous operations. First, agents may be installed in one or more applications at step 210. The agents may be installed in one or more applications which perform a distributed business transaction over several machines. Next, applications may be executed with distributed business transactions at step 220. In some embodiments, a request may be received by a first application on a first machine, which may then initiate a request on a second application on another machine, and son on, as part of the distributed business transaction. Any number of requests and applications on various machines may form the distributed business transaction.

The application may be monitored to collect data regarding application performance by agents at step 230. The agents may retrieve information regarding the performance of individual requests and other portions of applications forming the distributed business transaction. More details for monitoring an application by one or more agents as part of a distributed business transaction is discussed in U.S. patent application Ser. No. 12/878,919, titled "Monitoring Distributed Web Application Transactions," filed Sep. 9, 2010, the disclosure of which is incorporated herein by reference.

A request and a plurality of asynchronous operations associated with the request may be monitored as part of a distributed business transaction at step 240. The agent may initially monitor the request once the request is invoked or called. The request, in turn, may then execute one or more asynchronous operations, such as an asynchronous runnable element, callable element, thread, or any other invokable object, as part of the request. Monitoring the plurality of asynchronous operations may include maintaining a counter that indicates the number of currently pending or executing asynchronous operations and detecting the start time and end time of each such operation. Monitoring a request and plurality of associated asynchronous operations is discussed in more detail below with respect to the method of FIG. 4.

The performance data associated with the request is then reported at step 250. The performance data may be reported to a remote computer or server, such as a controller 190. Once the data has been received by the controller, the controller may associate performance data for different requests and organize them as business transactions. In particular, the controller may link asynchronous operations with the associated request and provide performance for the request and associated asynchronous operations as a single operation.

Figure 3:
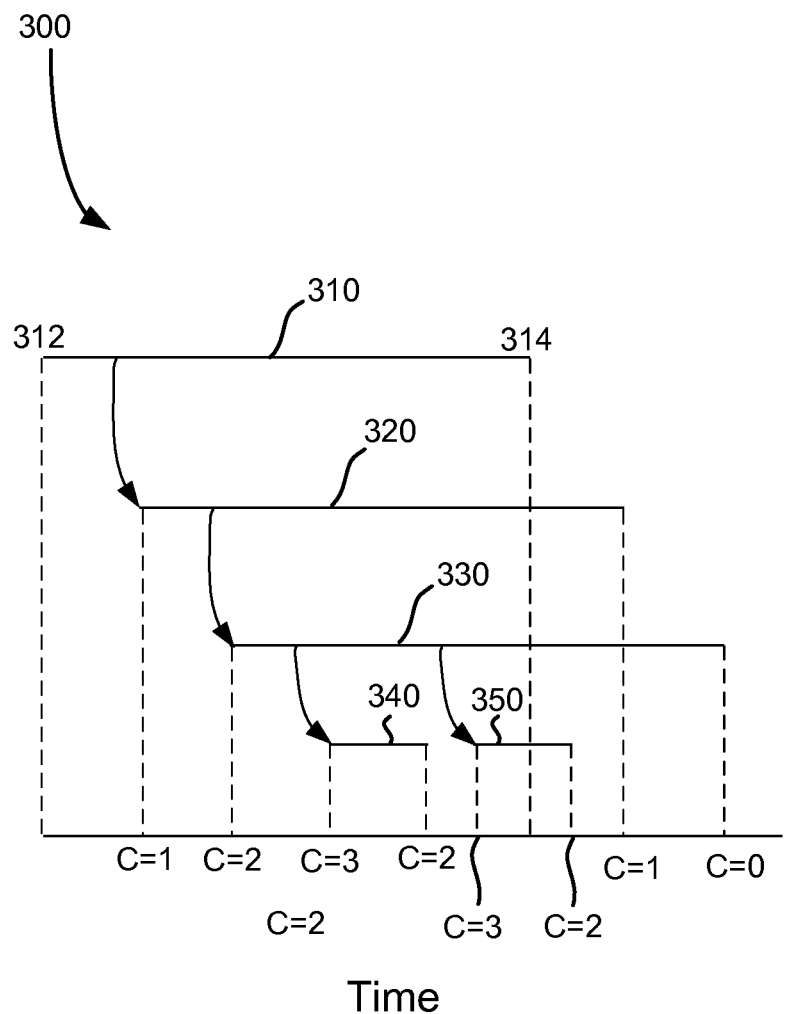
FIG. 3 is an illustration of asynchronous operations associated with a request.

FIG. 3 is a block diagram illustrating asynchronous operations associated with a request. In the block diagram of FIG. 3, an initial request 310 has a start time at 312 and an end time at 314. While executing, the request 310 may invoke an asynchronous object 320. Asynchronous object 320 may then invoke asynchronous object 330, which may then invoke asynchronous object 340 and 350.

The value of a counter changes based on the start and end of each asynchronous operation associated with request 310. For example, when a first asynchronous object 320 is first called, a counter value C is set to an initial value of 1. When the object 320 invokes asynchronous object 330, the counter value is set to 2. When asynchronous object 340 is called by object 330, the counter value is incremented to 3. When asynchronous object 340 completes, the counter value is decremented by 1 to a value of 2. When asynchronous object 350 is called by object 330, the counter is incremented again to a value of 3 and decremented back to a value of 2 when object 350 ends. When asynchronous object 320 ends, the counter is decremented to a value of 1. Finally, when the last executing asynchronous object 330 ends, the counter has a value of zero. Once the counter reaches a value of zero after the first asynchronous object has started, this signals that the request and its asynchronous operations are complete.

Once the request and its asynchronous operations are complete, the technology will measure various timings to report performance data. As discussed elsewhere, one possible implementation of those measurements is to report the difference between the start of the request and the completion of the final asynchronous operation. However, there are more possible ways to report performance data, including but not limited to the total time of each asynchronous operation, the maximum number of concurrent operations, and the average time of each asynchronous operation.

Though FIG. 3 was discussed with respect to asynchronous objects, any asynchronous operation could be tracked in place of the object, including an asynchronous callable, runnable, or thread.

Figure 4:
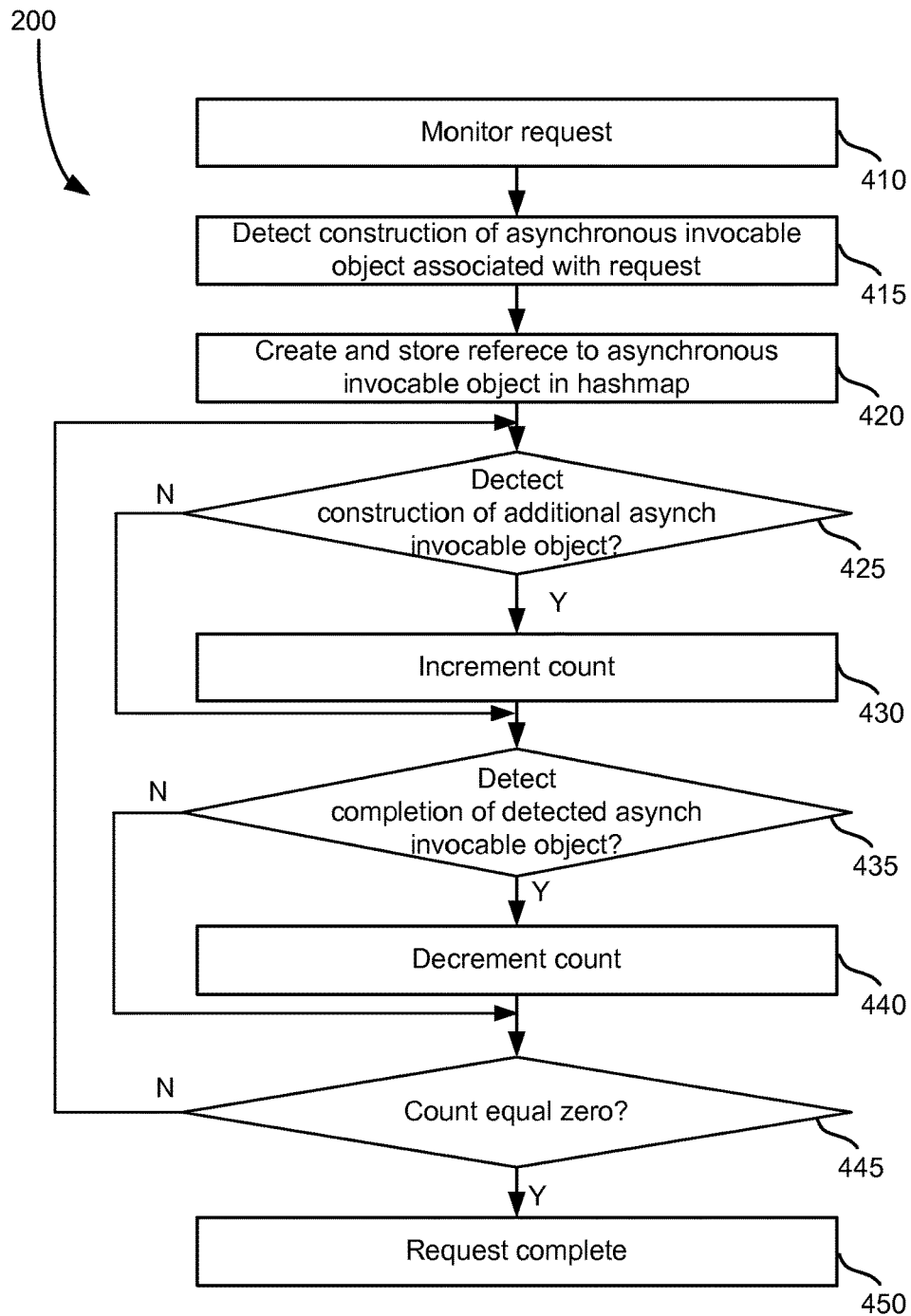
FIG. 4 is a method for monitoring a request in a plurality of asynchronous operations.

FIG. 4 is a method for monitoring a request and a plurality of asynchronous operations. The method of FIG. 4 provides more detail for step 240 of the method of FIG. 2. First, a request is monitored at step 410. The request may be any request being monitored.

Construction of asynchronous invokable objects associated with the request may then be detected at step 415. A reference to an asynchronous invokable object is then created and stored in a hash map at step 420. The reference may include the current count for the number of asynchronous operations that are currently executing.

Initially, the asynchronous invokable object reference may have a value of one, but may be adjusted as asynchronous operations begin and end. In some instances, an agent may have interceptors that handle the identification of an asynchronous object as well as management of the hash reference count. An interceptor may access the hash, increment the reference, and store the updated hash in response to detecting the operation by one of the agent interceptors.

A determination is made as to whether the construction of additional asynchronous invokable objects associated with the request is detected at step 425. In the block diagram of FIG. 3, additional asynchronous invokable objects may include objects 320, 330, 340 or 350. If an additional asynchronous invokable object is detected, the reference count is incremented at step 430 and the method continues to step 435. If no new asynchronous object construction is detected, the method continues to step 435.

A determination is made as to whether the completion of a previously detected asynchronous invokable object associated with the request is detected at step 435. If completion of one of the objects is detected, the count is decremented at step 440 and the method continues to step 445. If no completion of an asynchronous invokable object is detected, the method of FIG. 4 continues to step 445.

A determination is made as to whether the count for the request equals zero at step 450. If the count equals zero, all asynchronous invokable objects associated with the original monitored request are complete and monitoring of the request ends at step 455. At the end of monitoring the request, the total time for the request, the time taken for each of the invokable asynchronous objects, and other metrics may be collected and stored by an agent and ultimately reported to a controller. If the count is not equal to zero, then there is at least one asynchronous invokable object still executing and the method of FIG. 4 returns to step 410 where monitoring of the request continues.

Figure 5:
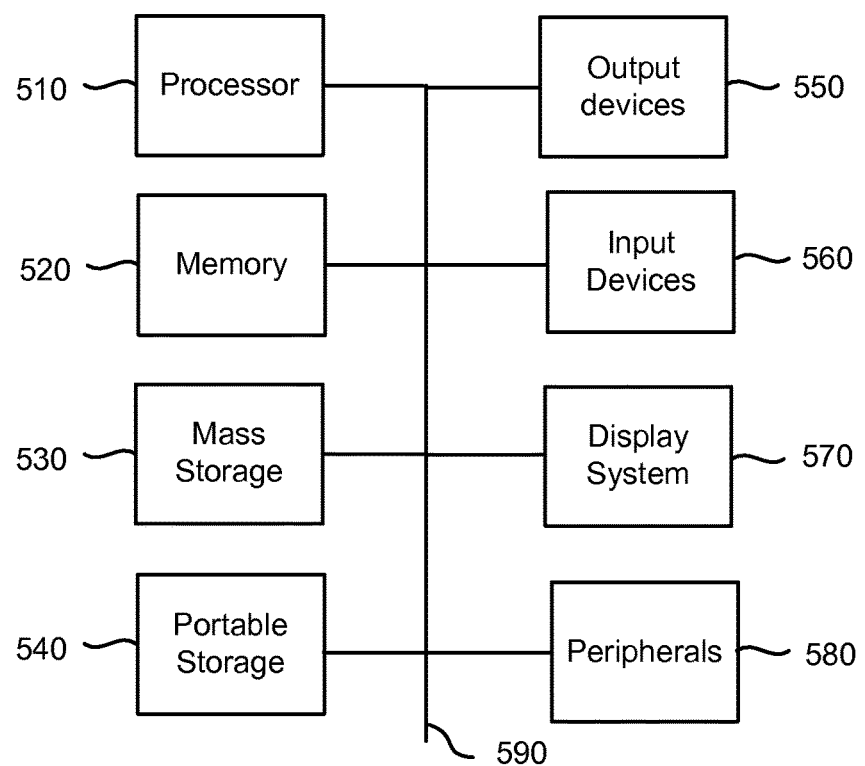
FIG. 5 is a block diagram of a computing environment for implementing the present technology.

FIG. 5 is a block diagram of a computing environment for implementing the present technology. System 500 of FIG. 5 may be implemented in the contexts of the likes of clients 105 and 192, network server 125, application servers 130-160, and data stores 190-185. A system similar to that in FIG. 5 may be used to implement mobile device 115, but may include additional components such as an antenna, additional microphones, and other components typically found in mobile devices such as a smart phone or tablet computer.

The computing system 500 of FIG. 5 includes one or more processors 510 and memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 510.

Portable storage device 540 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include an LED, liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

When implementing a mobile device such as smart phone or tablet computer, the computer system 500 of FIG. 5 may include one or more antennas, radios, and other circuitry for communicating over wireless signals, such as for example communication using Wi-Fi, cellular, or other wireless signals.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A system for monitoring an application, comprising:
 a processor;
 a memory; and
 one or more modules stored in memory and executable by
  a processor to perform operations including:
   monitoring a request, by an agent executing on a server, as part of a distributed business transaction;
   detecting one or more asynchronous operations associated with the request;
   monitoring the one or more asynchronous operations as part of monitoring the request, wherein monitoring includes tracking a start and end of each of the one or more asynchronous operations associated with the request and a number of asynchronous operations pending or executing;
   incrementing a counter when each of the one more asynchronous operations starts and decrementing the counter when each of the one or more asynchronous operations ends;
   identifying the end of the request based at least in part on when the counter returns to a zero value, the zero value indicating that the last of the one or more asynchronous operations associated with the request has ended; and
   reporting performance data for the asynchronous operations and request.

2. The system of claim 1, the distributed business transaction occurring over multiple servers.

3. The system of claim 1, the one or more asynchronous operations including a plurality of invokable asynchronous operations.

4. The system of claim 1, wherein the one or more modules are executable to monitor the asynchronous operations includes tracking the last executing asynchronous operation associated with the request.

5. The system of claim 4, wherein tracking includes updating a counter based on the one or more asynchronous operations.

6. The system of claim 5, wherein the one or more modules are executable to increment a count associated with the request when an asynchronous operation associated with the request is constructed.

7. The system of claim 5, wherein the one or more modules are executable to decrement a count associated with the request when execution of an asynchronous operation associated with the request has completed.

8. The system of claim 1, wherein the request is completed before the one or more asynchronous operations complete.

9. The system of claim 1, wherein the one or more modules are executable to provide the maximum number of concurrent threads, wherein a thread is associated with the request and each of the one or more asynchronous operations.

10. The system of claim 1, wherein the one or more modules are executable to provide the start time and end time of the request and one or more asynchronous operations.

11. A non-transitory computer readable storage medium having embodied thereon a program, the program being executable by a processor to perform a method for monitoring a mobile application, the method comprising:
monitoring a request, by an agent executing on a server, as part of a distributed business transaction;
detecting one or more asynchronous operations associated with the request;
monitoring the one or more asynchronous operations as part of monitoring the request, wherein monitoring includes tracking a start and end of each of the one or more asynchronous operations associated with the request and a number of asynchronous operations pending or executing;
incrementing a counter when each of the one more asynchronous operations starts and decrementing the counter when each of the one or more asynchronous operations ends;
identifying the end of the request based at least in part on when the counter returns to a zero value, the zero value indicating that the last of the one or more asynchronous operations associated with the request has ended, and
reporting performance data for the asynchronous operations and request.

12. The non-transitory computer readable storage medium of claim 11, the distributed business transaction occurring over multiple servers.

13. The non-transitory computer readable storage medium of claim 11, the one or more asynchronous operations including a plurality of invokable asynchronous operations.

14. The non-transitory computer readable storage medium of claim 11, wherein monitoring the asynchronous operations includes tracking the last executing asynchronous operation associated with the request.

15. The non-transitory computer readable storage medium of claim 14, wherein tracking includes updating a counter based on the one or more asynchronous operations.

16. The non-transitory computer readable storage medium of claim 15, wherein monitoring includes decrementing a count associated with the request when execution of an asynchronous operation associated with the request has completed.

17. The non-transitory computer readable storage medium of claim 15, wherein monitoring includes incrementing a count associated with the request when an asynchronous operation associated with the request is constructed.

18. The non-transitory computer readable storage medium of claim 11, wherein the request is completed before the one or more asynchronous operations complete.

19. The non-transitory computer readable storage medium of claim 11, wherein reporting includes providing the maximum number of concurrent threads, wherein a thread is associated with the request and each of the one or more asynchronous operations.

20. The non-transitory computer readable storage medium of claim 11, wherein reporting includes providing the start time and end time of the request and one or more asynchronous operations.

21. A method for monitoring an application, comprising:
monitoring a request, by an agent executing on a server, as part of a distributed business transaction;
detecting one or more asynchronous operations associated with the request;
monitoring the one or more asynchronous operations as part of monitoring the request, wherein monitoring includes tracking a start and end of each of the one or more asynchronous operations associated with the request and a number of asynchronous operations pending or executing;
incrementing a counter when each of the one more asynchronous operations starts and decrementing the counter when each of the one or more asynchronous operations ends;
identifying the end of the request based at least in part on when the counter returns to a zero value, the zero value indicating that the last of the one or more asynchronous operations associated with the request has ended; and
reporting performance data for the asynchronous operations and request.

22. The method of claim 21, the distributed business transaction occurring over multiple servers.

23. The method of claim 21, the one or more asynchronous operations including a plurality of invokable asynchronous operations.

24. The method of claim 21, wherein monitoring the asynchronous operations includes tracking the last executing asynchronous operation associated with the request.

25. The method of claim 24, wherein tracking includes updating a counter based on the construction of one or more asynchronous operations.

26. The method of claim 25, wherein monitoring includes incrementing a count associated with the request when an asynchronous operation associated with the request is constructed.

27. The method of claim 25, wherein the request is completed before the one or more asynchronous operations complete.

28. The method of claim 21, wherein reporting includes providing the maximum number of concurrent threads, wherein a thread is associated with the request and each of the one or more asynchronous operations.

29. The method of claim 21, wherein reporting includes providing the start time and end time of the request and one or more asynchronous operations.

30. The method of claim 21, wherein reporting includes providing the time spent processing each asynchronous operation.

\* \* \* \* \*